United States Patent [19]

Ernst

[11] 4,169,316
[45] Oct. 2, 1979

[54] VIBRATION RESISTANT MEASURING DEVICE

[75] Inventor: Alfons Ernst, Traunreut, Fed. Rep. of Germany

[73] Assignee: Dr. Johannes Heidenhain GmbH, Traunreut, Fed. Rep. of Germany

[21] Appl. No.: 883,788

[22] Filed: Mar. 6, 1978

[30] Foreign Application Priority Data

Mar. 22, 1977 [DE] Fed. Rep. of Germany ....... 2712422

[51] Int. Cl.² .............................................. G01B 11/04
[52] U.S. Cl. .................................. 33/125 C; 356/373
[58] Field of Search ............... 308/6 R; 356/169, 170, 356/172, 373, 374; 250/237 G; 33/125 R, 125 C, 125 A, 125 T, 76 R, 79 R, 1 M, 350; 104/118, 119, 245, 247, 139

[56] References Cited

U.S. PATENT DOCUMENTS

| 715,714 | 12/1902 | Walkins | 104/139 |
|---|---|---|---|
| 1,149,120 | 8/1915 | Fortune | 33/79 R |
| 1,837,158 | 12/1931 | Colvin | 33/350 |
| 2,788,749 | 4/1957 | Hinsken et al. | 104/118 |
| 3,094,942 | 6/1963 | Blumel | 104/245 |
| 3,721,967 | 3/1973 | Englert et al. | 308/6 |
| 4,070,759 | 1/1978 | Nelle | 33/125 C |

FOREIGN PATENT DOCUMENTS

| 1900475 | 7/1970 | Fed. Rep. of Germany | 33/350 |
|---|---|---|---|
| 22821 | of 1911 | United Kingdom | 33/350 |

Primary Examiner—Richard E. Aegerter
Assistant Examiner—John W. Shepperd
Attorney, Agent, or Firm—Hume, Clement, Brinks, Willian & Olds, Ltd.

[57] ABSTRACT

A vibration resistant measuring device is disclosed of the type which includes a scale and a scanning unit which is guided along the scale. This device includes a compensating mass connected to the scanning unit to counteract and reduce the tendency of the scanning unit to lift off the scale during periods of high acceleration.

12 Claims, 2 Drawing Figures

VIBRATION RESISTANT MEASURING DEVICE

BACKGROUND OF THE INVENTION

The invention relates to a measuring device, particularly an encapsulated longitudinal measuring device, comprising a scale, a plurality of guide surfaces, and a scanning unit guided at the scale and urged resiliently against the guide surfaces. Such measuring devices are utilized primarily to measure the relative movement of mobile machine parts.

In the operation of machine tools equipped with such measuring devices, or measuring devices in general, oscillations and other accelerations are often produced which may influence the measurement. The elimination or at least the reduction of the effect of such oscillations and accelerations on an optical instrument is the problem on which the invention according to the German Offlegungschrift DT-OS No. 1,900,475 is based. An arrangement is described there for stabilizing a pair of binoculars held by an observer. To maintain the binoculars in the desired orientation about their pitching axis, a counterweight and a resilient guide are used, preferably with aperiodic attenuation.

Counterweight and attenuation members arranged to reduce the effect of oscillations and thrusts have also been used in other areas as well. However, such known methods for reducing the repercussions of oscillations and thrusts cannot be simply applied to high precision longitudinal measuring devices, which are often capable of a precision of a few micrometers.

Due to the frequently rough operation of machine tools such measuring devices require special protection against external mechanical influences and special provisions for guiding mobile components. Generally such high precision measurement devices include a scanning unit which travels along the measuring scale. Both the scale and the scanning unit are surrounded by a tubular housing member which defines guide surfaces, and the scanning unit is positioned by rollers which travel along the guide surfaces. A powerful spring is used to bias the rollers against the guide surfaces and thereby prevent the scanning unit from lifting off the guide surfaces in the event of oscillations or accelerations of the tubular member.

For reasons of precision the scanning unit is guided in at least one plane directly at the measuring scale itself in many measuring devices. However, the scale must be protected against distorting compressive forces and friction against the scanning unit and, therefore, biasing forces acting to hold the scanning unit on the scale must be limited. Thus the danger exists that at peak acceleration of the tubular member the sensing unit may lift off the scale, thereby producing the possibility of both measuring errors and mechanical damage to the measuring device.

SUMMARY OF THE INVENTION

The present invention is directed to an improved measuring device in which the effects of oscillations and thrusts on the scale and the sensing unit are substantially reduced. The scanning unit of the device is effectively connected with a compensating mass which is so dimensioned and arranged that even at high accelerations the scanning unit is kept in contact with the guiding surface at the scale. The adverse effect of acceleration on the scanning unit may be further reduced by resiliently mounting any incandescent lamps and condensers included in the scanning unit. Special advantages result if the holding means for lamp and condenser has not too small a mass and if the lamp mounting means is formed from an elastomer having a high internal attenuation.

The invention, together with further objects and attendant advantages, will be best understood by reference to the following detailed description taken in connection with the accompanying drawings.

DETAILED DESCRIPTION OF A PREFERRED EMBODIMENT

Figure 1:
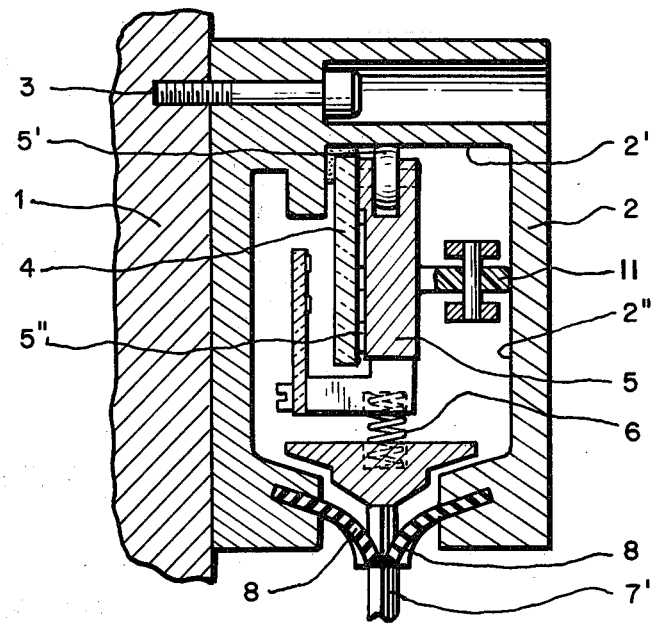
FIG. 1 is a cross-sectional view of a simplified presentation of a preferred embodiment of a longitudinal measuring device according to the present invention.

Referring now to the drawings, FIG. 1 shows a tubular housing 2 which is fastened with screws 3 to a machine component 1. A scale 4 is mounted within the housing 2 and a scanning unit 5 with mass M is seated inside the housing 2 at the guide surfaces 2' and 2" and at the guide surfaces 5" defined on the scale 4. Roller 5' is mounted on the scanning unit 5 and is biased by the powerful spring 6 against the guide surface 2'. A clutch 7 connects the scanning unit 5 with an entrainment means 7' fastened in a manner (not shown) to a machine component (likewise not shown) which carries out a relative movement in relation to the machine component 1 to be measured. The inner area of the tubular member 2 is sealed toward the outside by sealing lips 8 which embrace the sword-shaped entrainment means 7'.

Figure 2:
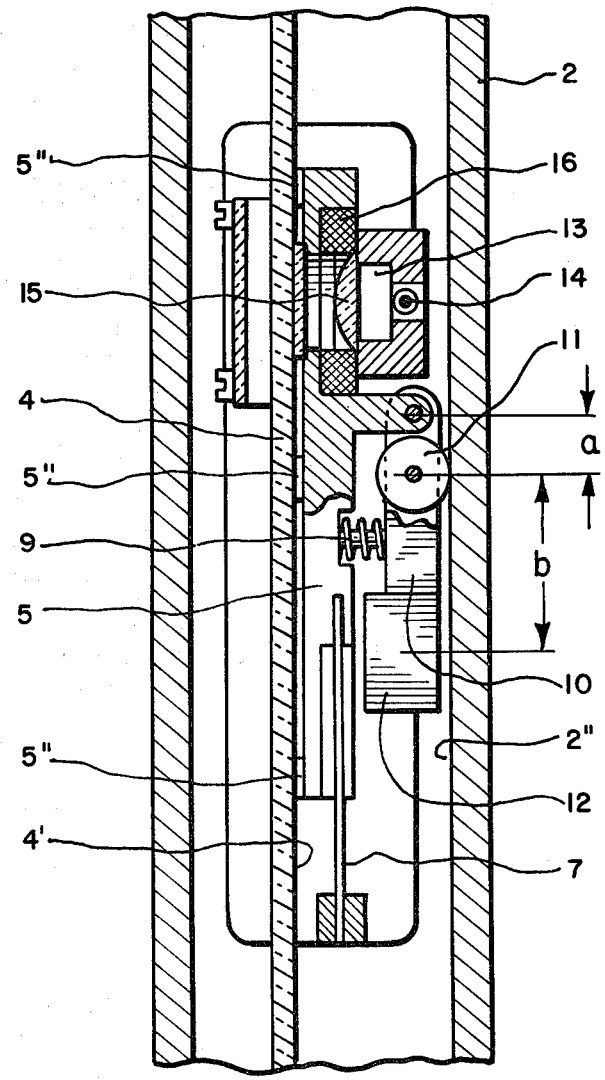
FIG. 2 is a longitudinal sectional view of the longitudinal measuring device of FIG. 1.

FIG. 2 shows the same measuring installation in longitudinal section. The scanning unit 5 is seated via guide surfaces 5" on the scale 4. However, scale 4 is a highly precise measuring scale which must be protected from excessive distorting forces or excessive friction between the scale 4 and scanning unit 5. A contact lever 10 is pivotably connected to the scanning unit 5, and a roller 11 is rotatably mounted on the lever 10. The lever 10 is biased away from the scanning unit 5 by the spring 9, and the force supplied by spring 9 operates to press the roller 11 into contact with the guide surface 2" and the scanning unit 5 into contact with the guide surfaces 5" on the scale 4.

A compensating mass 12 having mass m is mounted on the free end of the lever 10. The length of the lever arms a and b of the lever 10 are so dimensioned that the product of the mass M and the distance a is equal to the product of the mass m and the distance b. If a positive acceleration X acts on the scanning unit 5 a clockwise torque is produced about the axis of the roller 11 equal to the product of the acceleration X, the mass of the scanning unit M and the distance a. However, the same acceleration X also acts on the compensating mass 12 and thereby produces a counterclockwise torque equal to the product of the acceleration X, the mass of the compensating mass m and the distance b. Because of the relationship between the distances a and b, the counterclockwise torque substantially cancels the clockwise torque, thereby reducing the tendency of the scanning unit 5 to lift off the scale 4.

In operation, the scanning unit 5 is normally held in sliding contact with the scale 4 by the spring 9. The stiffness of spring 9 is chosen so that the scale 4 is not distorted excessively by either the contact force or the resulting friction between the scanning unit 5 and the scale 4. The compensating mass 12 and lever arm 10 operate to maintain this contact force more nearly constant during periods of acceleration. Accelerations act on both the compensating mass 12 and the scanning unit 5 and the torques generated thereby about the axis of the roller 11 tend to cancel. Thus, the tendency of the scanning unit 5 to rotate about the axis of the roller 11 under lateral acceleration is reduced, and the contact face between the scanning unit 5 and the scale 4 is maintained more nearly constant.

To increase the insensitivity of the measuring device to acceleration, it is possible to mount the illuminating unit 13 comprising a lamp 14 and a condenser 15, resiliently on the scanning unit 5. In this case it is preferable not to keep the mass of the illuminating unit 13 too small and to use an elastomer with high internal attenuation as resilient mount 16.

Of course, it should be understood that various changes and modifications to the preferred embodiment described above will be apparent to those skilled in the art. Such changes and modifications can be made without departing from the spirit and scope of the present invention and without diminishing its attendant advantages. It is, therefore, intended that such changes and modifications be covered by the following claims.

I claim:

1. In a position measuring device having a measuring scale, first and second spaced guide surfaces, a scanning unit, and means for positioning the scanning unit with respect to the guide surfaces for guiding the scanning unit along the scale, the improvement comprising:
   a compensating mass;
   means for connecting the compensating mass to the scanning unit;
   means, mounted on the connecting means, for contacting the first guide surface; and
   means for biasing the contacting means into contact with the first guide surface, said biasing means acting to urge the scanning unit into contact with the second guide surface, and said compensating mass arranged to reduce the tendency of the scanning unit to lift off the second guide surface when acceleration is applied to the guide surfaces.

2. The measuring device of claim 1 wherein the second guide surface is defined by the scale.

3. The measuring device of claim 1 wherein the connecting means includes a contact lever mounted on the scanning unit, the contacting means includes a roller mounted on the contact lever, and the biasing means includes a spring mounted between the contact lever and the scanning unit.

4. The measuring device of claim 1 further including an illuminating unit and means for resiliently mounting the illuminating unit on the scanning unit.

5. The measuring device of claim 2 wherein the mounting means includes an elastomer having high internal attenuation.

6. A position measuring device comprising:
   a measuring scale defining a guide surface;
   an opposed surface spaced from the measuring scale;
   a scanning unit guided along the scale by the guide surface;
   means for generating a force biasing the scanning unit away from the opposed surface such that the scanning unit is urged into contact with the scale;
   a lever arm having a first section connected to the scanning unit, a fulcrum connected to the force generating means, and a second section;
   a compensating mass mounted on the second section of the lever arm, the compensating mass having a mass which generates a torque about the fulcrum when an acceleration is applied to the fulcrum, which torque substantially cancels the torque generated by the scanning unit about the fulcrum, thereby reducing the tendency of the scanning unit to lift off the scale when an acceleration is applied to the fulcrum.

7. The device of claim 6 further including an illuminating unit and means for resiliently mounting the illuminating unit on the scanning unit via an elastomer having high internal attenuation.

8. The device of claim 6 wherein the opposed surface is formed by an interior surface of a housing which substantially surrounds the scale.

9. The device of claim 6 wherein the force generating means includes a roller mounted at the fulcrum of the lever and a spring mounted to bias the lever away from the scanning unit and the roller into contact with the opposed surface.

10. A positioning measuring device comprising:
    a measuring scale;
    a guide surface extending substantially parallel to the measuring scale and spaced therefrom;
    a scanning unit guided along the scale;
    a contact lever having a first end connected to the scanning unit, a fulcrum, and a second end;
    a roller pivotably connected to the fulcrum and positioned to contact the guide surface;
    means for biasing the contact lever away from the scanning unit and the roller into contact with the guide surface; and
    a compensating mass secured to the second end of the contact lever and acting to reduce the tendency of the scanning unit to lift off the scale when an acceleration is applied to the fulcrum.

11. The device of claim 10 further including an illuminating unit and means for resiliently mounting the illuminating unit on the scanning unit.

12. The device of claim 10 wherein the guide surface is formed on an interior surface of a housing which substantially surrounds the scale.

* * * * *